Inventor
Edwin L. Cline
By Bacon & Thomas
Attorneys

Aug. 28, 1951 E. L. CLINE 2,565,473
ENGINE ADAPTER AND SUPPORT
Filed July 10, 1946 4 Sheets-Sheet 4

Inventor
Edwin L. Cline
By Bacon & Thomas
Attorneys

Patented Aug. 28, 1951

2,565,473

UNITED STATES PATENT OFFICE 2,565,473

ENGINE ADAPTER AND SUPPORT

Edwin L. Cline, Pasadena, Calif., assignor to Clayton Manufacturing Company, Alhambra, Calif., a corporation of California Application July 10, 1946, Serial No. 682,513

27 Claims. (Cl. 74—16)

The present invention relates to novel means for adapting and supporting an infinite number of types and makes of engines for test and other purposes.

More particularly, the invention relates to a universal engine supporting stand and a universal adapter kit for supporting various engines upon said stand for testing by a suitable power absorption device, for example, a hydraulic dynamometer; or for driving of the engine, for example, by a motoring dynamometer or other device.

In the past, the testing of engines by dynamometers has been confined, more or less, to laboratories; and, as a rule, special fixtures and adapters were provided for supporting each different type of engine upon a stand for test purposes. These fixtures or supports were usually of special design and although considerable time was required to fabricate and attach the same to mount the engine for testing, the amount of money and time so spent was comparatively small with respect to the expense and period of duration of the test. However, in recent times, there has been a demand both upon the part of engine manufacturers, and engine servicing and repair establishments having dynamometer equipment, for means capable of supporting an infinite number of types and models of engines with a minimum amount of expenditure of money for equipment and of time for setting up or mounting the engine to be tested. The problem of cheaply and quickly mounting an engine for test purposes is not so serious with an engine manufacturer who makes only a few different types or models of engines, but is far more serious with garages and engine servicing establishments which are required to handle all sizes and types of truck and passenger car engines.

Engine manufacturers are primarily interested in determining the operating characteristics of new engines, although considerable interest is being manifested in employing dynamometers for running-in or breaking-in new engines so that the purchaser of a new motor vehicle is relieved of the usual slow driving period to "break-in" the engine. On the other hand, engine repairing and rebuilding establishments employ dynamometers for either testing the engine to determine its operating characteristics, or for breaking-in or running-in partially or completely rebuilt engines, so that when such an engine is installed in a motor vehicle, it can be immediately run at any operating speed desired without the danger of burning out the bearings or causing excessive cylinder wear. Therefore, in either case, it is of the utmost importance that the time required for setting up the engines for test purposes shall be maintained at a minimum in order to keep costs as low as possible.

The problem of quickly and cheaply supporting various types and makes of engines for dynamometer test purposes has been greatly complicated by the lack of standardization on the part of engine manufacturers with respect to the design and construction of the clutch and flywheel housings and also with respect to the arrangement and location of the holes for the reception of the bolts which normally secure the transmission casing to such housing. This lack of standardization has necessitated the use of special supports or adapters for each type of engine to be tested, as before stated, thus entailing considerable expense for the adapter parts and also requiring the expenditure of considerable time in adjustment and changing from one set of special adapters to another when different engines are tested in succession. So far as is known, no means prior to the present invention has been designed upon principles which are of generally universal application for adapting and supporting engines of all well-known makes of cars and trucks for test and other purposes.

The provision of means of general application for supporting the front end of various types and makes of engines presents only a relatively minor problem in view of the fact that practically all engines are provided with flanges or mounting pads adapting the same to be readily supported by a pair of vertical brackets. However, the provision of universal adapter and supporting means for the rear end of an infinite number of engines has presented a relatively much more complex problem due to the fact that it is highly desirable to take the power off the engine at a point ahead of the transmission and, therefore, the mounting means must provide for adequate support regardless of the design of the clutch and flywheel housing and the spacing of the bolt holes provided therein for normally securing the transmission casing thereto. The provision of supporting means for the rear end of an engine is still further complicated by the fact that the distance between the end of the crankshaft, or the driven element of the clutch, and the transmission shaft opening in the clutch housing is not standardized, and suitable means must be provided for transmitting the engine driving torque from the engine crankshaft, or another element driven by the engine, to the power absorption device. The problem of engine torque transmission is solved in the present invention by an adapter shaft incorporated in the supporting means for the rear end of the engine and through the provision of means for transmitting the torque of a driven element of the engine to said adapter shaft.

As will be apparent from the foregoing, the principal object of this invention is to satisfactorily solve the problems heretofore existing in supporting an infinite number of types and makes of engines for test purposes and in transmitting the torque developed by said engines to a power absorption device.

Another important object of the invention is to provide supporting means for the rear end of an engine which requires no major readjustments to accommodate different types and makes of engines.

Still another object of the invention is to provide means for supporting the rear end of an engine including an adapter shaft and relatively simple means for establishing a driving connection between said adapter shaft and an element driven by the engine undergoing test.

A further object of the invention is to provide engine supporting means including means for supporting the rear end of an engine in relation to a power absorption device so that no changes or adjustments are required in the means connecting the adapter shaft of the engine supporting means with the shaft of the power absorption device when different types of engines are tested in succession.

A further object of the invention is to provide a universally adjustable engine stand and an adapter kit for use with said stand including a relatively few parts capable of mounting an infinite number of different types of engines upon said stand and for readily transmitting the driving torque of an engine so mounted to a power absorption device.

A still further object of the invention is to provide engine supporting and adapter means which is of relatively simple construction and relatively inexpensive to make, but which, nevertheless, embodies principles adaptable to mounting and supporting all types of engines.

Other objects and advantages of the invention will be apparent from the following description taken in conjunction with the accompanying drawings, in which.

Figure 1:
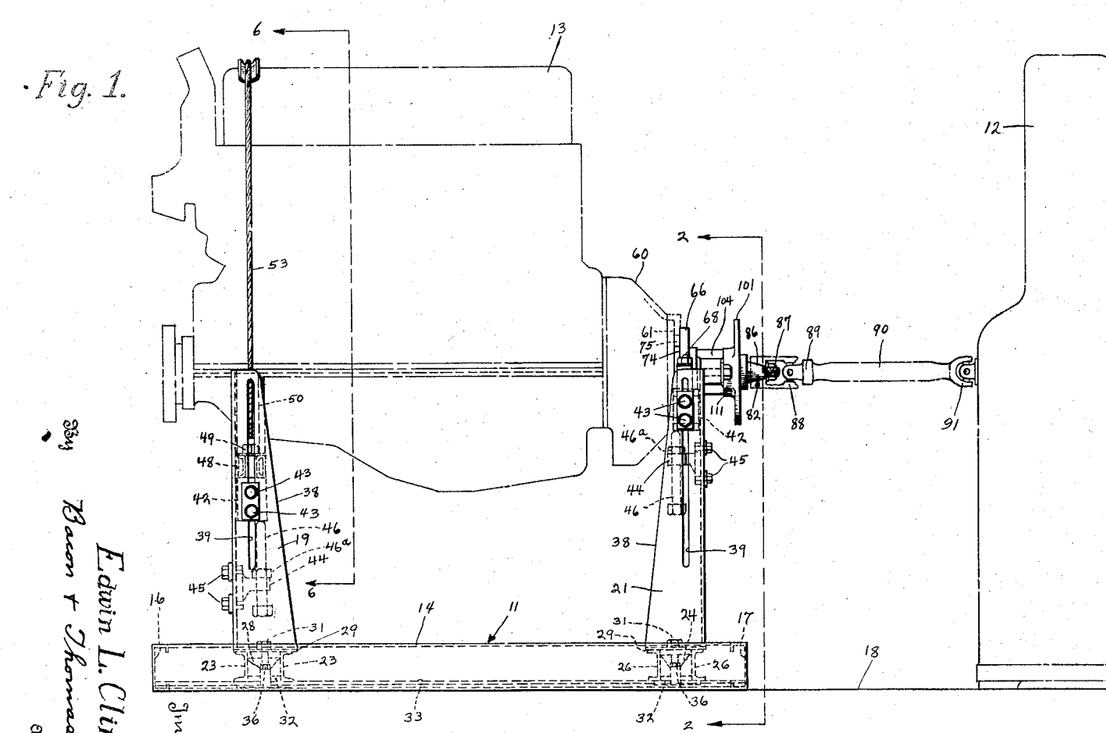
Fig. 1 is a side elevational view of a stand and engine supporting and adapter means embodying the principles of the present invention for supporting an engine relative to a device for absorbing the power developed by said engine.
Figure 2:
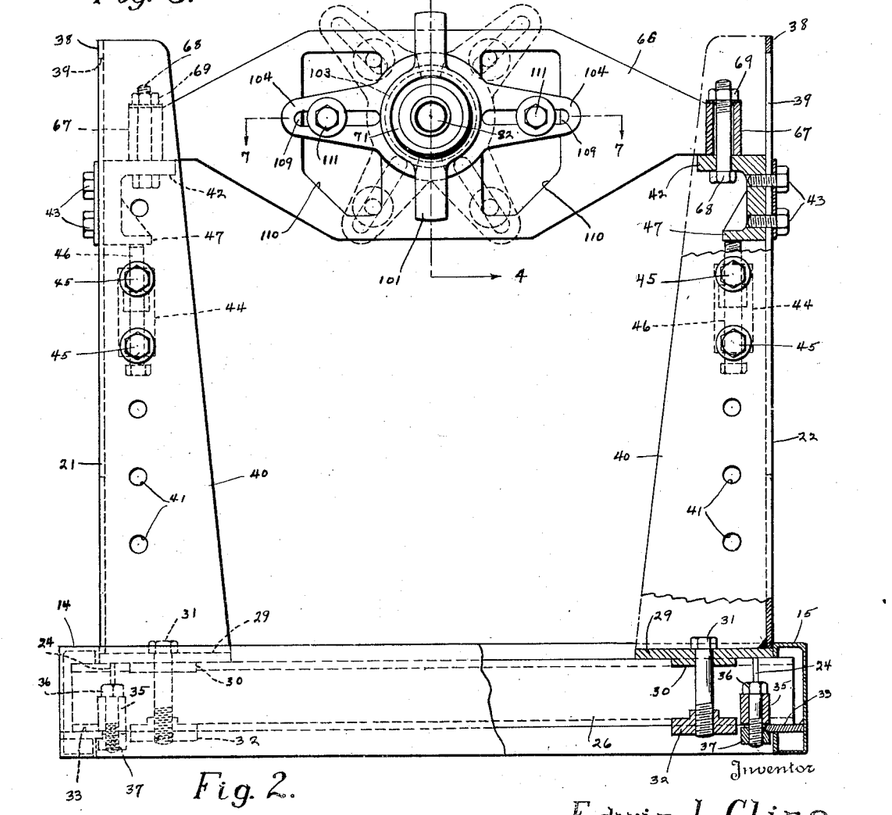
Fig. 2 is an enlarged right end elevational view of the stand and engine adapter and supporting means as viewed on the line 2—2 of Fig. 1.
Figure 3:
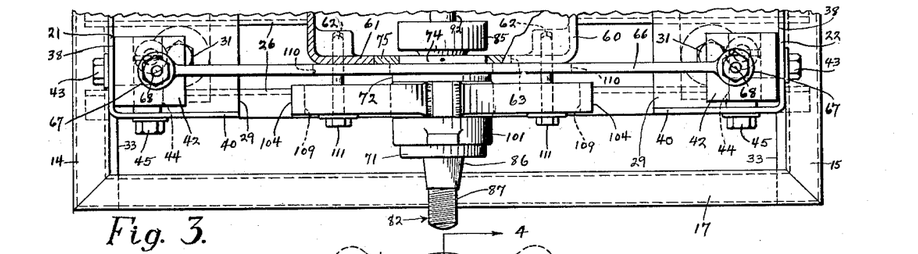
Fig. 3 is a fragmentary plan view of the apparatus shown in Fig. 2.

Referring now to Fig. 1 of the drawings, the numeral 11 generally identifies a universally adjustable engine stand having the novel engine supporting and adapter means of the present invention associated therewith. A suitable or conventional dynamometer or power absorption device is shown in dot-and-dash lines adjacent the right end of the stand 11 and is identified by the numeral 12. An engine mounted on the stand 11 and arranged to be tested by the dynamometer 12 is also shown in dot-and-dash lines and is identified by the numeral 13. The dynamometer 12 is employed to subject the engine 13 to various service loads at different throttle openings; various instruments (not shown) being associated with the dynamometer to indicate the speed, horsepower, etc., developed by said engine.

The base of the engine stand 11 comprises channel-shaped side members 14 and 15 and channel-shaped end members 16 and 17, all suitably welded or otherwise secured together. Any suitable hold-down means (not shown) may be employed for securely fastening the stand 11 to a floor 18. It will be understood, of course, that the dynamometer apparatus 12 is also fixedly secured to the floor 18 by means, not shown.

The stand 11 includes front columns 19 and 20 for supporting the front end of the engine 13 and rear columns 21 and 22 for supporting the rear end of said engine. The front columns 19 and 20 rest upon transverse channel members 23 interconnected at their opposite ends by a web 24. The rear columns 21 and 22 are similarly supported by a pair of channel members 26 secured together at their opposite ends by webs 28. Each of the columns 19—22 includes a base portion 29 having a depending projection 30 which extends into the space between the associated channel members 23—23 or 26—26. A bolt 31 extends through each base portion 29 and is threaded into a clamping plate 32 arranged at the underside of the channel members 23—23 or 26—26 in non-rotatable relation therewith. Thus, it will be apparent that the front columns 19 and 20 can be adjusted toward and away from each other along the channel members 23—23 and located in any desired position of adjustment by tightening the bolts 31. It will also be apparent that the rear columns 21 and 22 can be similarly adjusted and located in any desired position of adjustment along channel members 26—26.

The channel members 23—23 and 26—26 rest upon longitudinally extending rails 33 disposed within the side channel members 14 and 15. The webs 24 disposed between each pair of channels 23—23 and the webs 28 disposed between each pair of channels 26—26 carry an upright apertured boss 35 having its lower end disposed adjacent the rail 33 and adapted to receive a bolt 36. A nut 37 on the bolt 36 is arranged to non-rotatably engage with the lower inner edge of the rail 33, so that when the several bolts 36 are tightened, all relative movement between the rails 33 and the channel members 23—23 and 26—26 is prevented.

In the ordinary use of the stand 11 with the present adapter kit, which will be more fully described in detail later, the rear columns 21 and 22 remain in a predetermined position of longitudinal adjustment with respect to the dynamometer apparatus 12, so that the position of these columns need not be readjusted for every different make and type of engine tested. On the other hand, the front columns 19 and 20 can be adjusted longitudinally of the stand 11, that is, moved toward or away from the rear columns 21 and 22 to accommodate engines of various lengths. However, the present adapter kit includes supporting means for the front end of the engine, which will be described later, that eliminates the necessity for adjusting the front columns 19 and 20 toward and away from each other.

Each of the columns 19—22, respectively, is generally angle-iron shape in transverse cross-section and includes a longitudinally extending web 38 provided with an elongated vertical slot 39, and a transversely extending web 40 provided with a plurality of evenly spaced holes 41 arranged in vertical relation. Each of the webs 38 carries a bracket 42 adjustably secured thereto by bolts 43 which extend through the elongated slot 39. On the other hand, each of the webs 40 carries a bracket 44 that can be secured thereto at any desired vertical height by passing bolts 45 through preselected holes 41. Each bracket 44 carries a bolt 46, the upper end of which engages a projection 47 extending inwardly from the bracket 42. The bolt 46 provides for relatively small or vernier adjustment of the bracket 42 with respect to its associated column and is locked in place by a lock nut 46a. The brackets 44 and the bolts 46 further serve as a safety means for preventing the engine from dropping in the event that the bolts 43 should work loose.

The forward end of the engine 13 is supported by a transverse bar 48 (Fig. 6), which forms a part of the present adapter kit. The opposite ends of the transverse bar 48 rest upon the brackets 42 carried by the front columns 19 and 20. Bolts 49 securely connect the ends of the bar 48 to the brackets 42. Any desired vertical adjustment of the bar 48 with respect to the floor 10 can be effected by suitable adjustment of the brackets 42, and also the brackets 44, if necessary. If only a slight raising or lowering of the bar 48 is required, this can be effected by unloosening the bolts 43 and adjusting the brackets 42 and the screws 46 to the necessary extent. When the bolts 46 have been adjusted to the proper position they are locked in place by the lock nuts 46a, and the bolts 43 are drawn up tightly.

Figures 4, 5, 6:
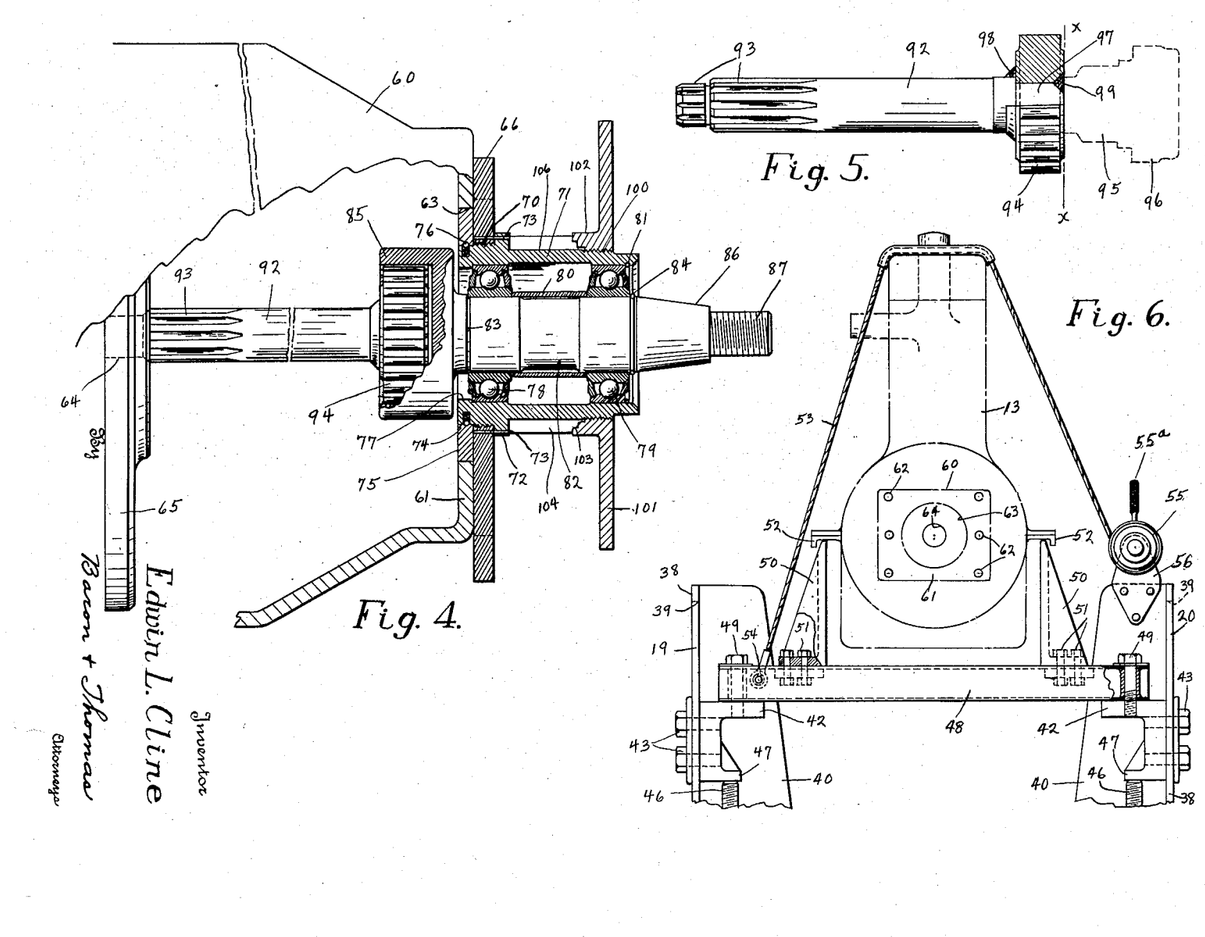
Fig. 4 is an enlarged sectional view taken on the line 4—4 of Fig. 2, but showing the engine adapter and supporting means in association with a clutch and flywheel housing.
Fig. 5 illustrates the manner in which suitable torque transmitting means, for transmitting the driving torque from an element driven by an engine to an adapter shaft of the supporting means for the rear end of an engine, can be fabricated from a discarded transmission shaft.
Fig. 6 is a view partly in section illustrating the means for supporting the front end of an engine and means for tying the front end of the engine down with respect to its supporting means, as viewed on the line 6—6 of Fig. 1.
Figures 7, 8:
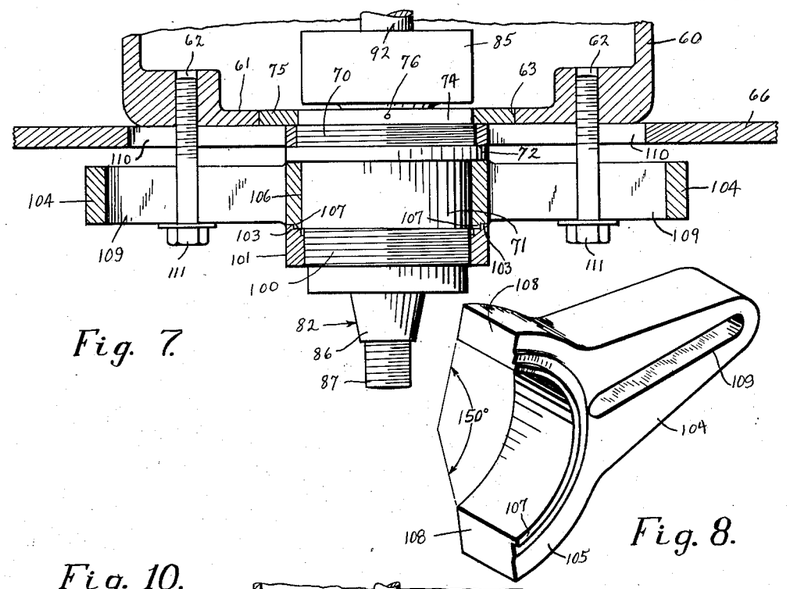
Fig. 7 is an enlarged sectional view taken on the line 7—7 of Fig. 2.
Fig. 8 is a perspective view of one of the clamping arms of the rear end engine mounting means.

A pair of brackets 50 is carried by the bar 48 and adjustably mounted thereon by bolts 51. The brackets 50 are preferably adjusted so that the upper ends thereof will be positioned beneath flanges 52 or any other suitable mounting pads projecting from the engine 13. Normally, the brackets 50 provide sufficient support to stabilize the front end of the engine inasmuch as there is no danger of the engine twisting relative to the brackets 50 while the engine is being tested, as will be apparent later. However, as a matter of precaution, one end of a cable 53 is fastened by a pin 54 to the bar 48 and extends over the top of the engine 13 and its opposite end is secured to a conventional ratchet type of cable tightening device 55 mounted upon the column 20 by a mounting plate 56. The cable tightening device 55 includes a handle 55a that is adapted to be operated to tighten the cable 53 to any extent desired. Thus, the means for supporting and tying down the front end of the engine is relatively simple in construction and readily adjustable for raising or lowering the front end of the engine so that the engine crankshaft (not shown) will be disposed substantially horizontally with respect to the dynamometer apparatus 12.

Referring now to Figs. 2 to 5, inclusive, 7 and 8, which illustrate a preferred form of mounting means for the rear end of the engine 13, the numeral 60 indicates a housing member, which may be the usual clutch and flywheel housing associated with the engine 13, or a bell housing employed with certain types of engines having an open face clutch and flywheel housing. The design and construction of the housing member 60 varies with practically every make and type of engine, thereby creating a complex problem in securely supporting the rear end of the engine for test purposes. The housing member 60 usually includes an end wall 61 against which the transmission casing (not shown) is bolted. Here again, the position and arrangement of the bolt holes for securing the transmission casing to the housing member 60 also varies with practically every make and type of engine. For illustrative purposes, these bolt holes have been shown arranged in two vertical rows and identified as 62 in Fig. 6. The end wall 61 normally includes an opening 63 for aligning the transmission shaft (not shown) with the opening 64 (Figs. 4 and 6) in the driven element 65 of the clutch. The diameter of the transmission shaft opening 63 also varies with various makes and types of engines due to a lack of standardization in this respect. However, the present adapter kit includes means for overcoming this difficulty as will be pointed out later.

The supporting means for the rear end of the engine includes an elongated main plate 66 carrying a boss 67 at each end thereof. The bosses 67 and the adjacent ends of the plate 66 rest upon the upper surface of the brackets 42 and are secured thereto by bolts 68 and nuts 69 threaded on said bolts. The plate 66 is mounted centrally or medially thereof upon a threaded portion 70 of a cylindrical body or housing portion 71. The threaded portion 70 is disposed adjacent a flange 72 against which the plate 66 is preferably jammed and held against relative rotation by one or more pins 73. The housing portion 71 includes a cylindrical pilot portion 74 which is of a diameter corresponding to the smallest diameter of transmission shaft opening found in clutch housings. The opening 63 shown in the housing member 60 is much larger than the external diameter of the pilot portion 74. In order to provide for centering or concentric mounting of the housing portion 71 with respect to the opening 63, an annular bushing or adapter 75 is provided to fill the space between the pilot portion 74 and the opening 63. The internal diameter of the bushing 75 is made to fit snugly upon the pilot portion 74 and one or more spring-pressed detents 76 serve to detachably retain the same thereon and prevent inadvertent displacement of said bushing with respect to said pilot portion. It is contemplated that the present adapter kit will include a number of annular bushings or adapters each having an opening of the same diameter as the pilot portion 74, but having various outside diameters and including at least one bushing large enough to fit the largest size transmission shaft opening 63 that will be encountered in practice. A mechanic, in desiring to test an engine having a housing member 60 with a given diameter transmission shaft opening 63, can then readily select the proper size adapter ring 75 or place an adapter blank of a size nearest thereto in a lathe and turn the external diameter thereof down so that it will properly fit in the opening 63. This is feasible because engine servicing establishments having dynamometer equipment invariably have one or more lathes, and reducing the size of the adapter bushing or ring 75 is a very simple operation and requires very little time.

The housing portion 71 is hollow and is shouldered as indicated at 77 to form an abutment for the outer race of a ball bearing 78. A second ball bearing 79 is spaced from the ball bearing 78 by a sleeve 80 and is retained in the housing 71 by a snap ring 81. The ball bearings 78 and 79 are preferably of the conventional, lubrication sealed type. An adapter shaft 82 extends through the ball bearings 78 and 79 in concentric relation to the housing portion 71. The adapter shaft 82 has a shoulder 83 which engages the inner race of the ball bearing 78. A snap ring 84 mounted on the adapter shaft 82 engages the inner race of the ball bearing 79 and prevents relative longitudinal movement of the adapter shaft 82 with respect to the ball bearings 78 and 79.

One end of the adapter shaft 82 carries an internal gear 85 and the opposite end of said shaft includes a tapered portion 86 and a threaded stud portion 87 to which an element 88 (Fig. 1) of a universal joint 89 is adapted to be connected. The universal joint 89 is connected to one end of a shaft 90 and the opposite end of said shaft is connected by a universal joint 91 with a hydraulic brake or other power absorption device (not shown) forming part of the dynamometer apparatus 12.

A driving connection is established between the driven clutch element 65 and the internal gear 85 through a torque transmitting means including a shaft 92 provided at one end thereof with splines 93 adapted to be engaged with the splined opening 64 in the clutch element 65 and provided at its opposite end with a spur gear 94 adapted to mesh with the internal gear 85 carried by the adapter shaft 82. It will be understood that there is sufficient play between the teeth of the internal gear 85 and the teeth of the spur gear 94 to compensate for any slight misalignment of the axis of the adapter shaft 82 with the axis of the engine crankshaft (not shown).

The overall length of the torque transmitting means 92—94 will vary with different types and makes of engines and it is contemplated that the same may be fabricated by the user of the present kit from a discarded transmission shaft usually associated with the particular type and make of engine being tested. It so happens that the main shaft of transmissions, in general, is the one which fails most frequently due to stripped gears, etc. Hence, large automotive service establishments usually have a number of such discarded shafts in their pile of damaged or broken parts resulting from replacement jobs. Fig. 5 illustrates the manner in which a discarded transmission shaft carrying the usual cluster gears 95 and 96 (shown in dotted lines) can be modified and adapted to serve as the torque transmitting member 92—94. Thus, the cluster gears 95 and 96 can be removed from the shaft by cutting the shaft, to obtain a desired length thereof, along the line X—X and turning down the adjacent portion of the shaft to produce a reduced end 97. The gear 94 is then mounted upon the reduced end 97 and preferably welded thereto as indicated at 98 and 99.

The present adapter kit preferably includes a number of gears 94 adapted to serve in the reconversion of discarded transmission main shafts in order to adapt the same to serve as torque transmitting means. On the other hand, in instances where the user is not likely to have a number of discarded transmission shafts around the shop that could be converted into the torque transmitting means 92—94, the present adapter kit will include a number of such means suitable for use with the most popular makes of automobile and truck engines.

The housing portion 71 is threaded as indicated at 100 and a wing nut 101 is threaded thereon. The wing nut 101 includes an annular extension 102 having a shouldered or stepped inner face 103. Clamping means, preferably in the form of a pair of clamping arms 104, is disposed between the stepped shoulder 103 and the flange 72. One of the clamping arms 104 is shown in perspective in Fig. 8 and it will be noted that the same includes an inner arcuate end 105 which is of the same radius as the outside diameter of the portion 106 of the housing 71 (see Fig. 7). Each of the clamping arms 104 is provided with an arcuate rib or projection 107 which is received under the stepped portion 103 of the wing nut 101. Each of the clamping arms 104 has end faces 108 which are arranged at an angle of about 150° with respect to each other, whereby to enable said arms to be either disposed in substantially diametrical alignment in the two extreme positions shown in dotted lines in Fig. 2, or adjusted out of diametrical relation. Each of the arms 104 is also provided with an elongated slot 109.

The plate 66 is provided with large openings 110 (Fig. 2) disposed upon the opposite sides of the housing portion 71. The openings 110 are of such shape and physical dimensions and are so located with respect to the housing member 60 that they will expose or afford access to at least two transmission bolt holes, such as the holes 62 in the various types of clutch housings.

As has been previously pointed out, it is unnecessary to readjust the rear columns 21 and 22 of the stand 11. This follows from the fact that, once the plate 66 has been bolted to the stand 11 and alignment of the adapter shaft 82 with the dynamometer drive shaft 90 has been effected, the rear end of all engines to be tested can be supported in the same position by the plate 66. Therefore, all further adjustments between the adapter shaft 82 and the dynamometer apparatus 12 are obviated.

In order to mount an engine upon the stand 11, for test purposes, a suitable annular adapter or bushing 75, which will fit the opening 63 is selected from the kit and mounted upon the pilot portion 74 of the housing portion 71. Also, a suitable torque transmitting means 92—94 is selected or provided and the gear 94 thereof is placed in mesh with the internal gear 85 of the adapter shaft 82. The engine to be tested is supported by a suitable crane or chain lock and tackle (not shown) and is manipulated into such position that the splines 93 will be received in the opening 84 of the driven clutch member 65 and the annular adapter ring 75 is received in the opening 63 of the housing member 60. The meshing of the gears 85 and 94 provides a positive driving connection between the engine crankshaft (not shown) and the adapter shaft 82, and at the same time compensates for any slight angular misalignment between these shafts, which is of importance when the many tolerances of the parts of the adapters and engines are considered.

After the driving connection between the engine and the adapter shaft 82 has been established as aforedescribed, suitable adjustment of the bar 46 for supporting the front end of the engine is made, if necessary, so that the engine is disposed substantially horizontally. The clamping arms 104 are then adjusted so that each of the slots 109 thereof registers with one opening 62 in the housing member 60. The wing nut 101 is then tightened to lock the clamping arms 104 in the desired position of angular adjustment with respect to the housing portion 71 and the plate 66. Bolts 111 are then inserted through the slots 109, and through the openings 110 in the plate 66 and are tightly screwed into two of the holes 62 so as to draw the housing member 60 toward and tightly against the plate 66. The weight of the rear end of the engine 13 will then be primarily supported by the plate 66 through the annular bushing 75, which transmits the downwardly acting thrust from the housing member 60 to the pilot portion 74 of the housing portion 71. Of course, the engine 13 is prevented from shifting or turning with respect to the plate 66 and the rear columns 21 and 22 by virtue of the bolts 111 connecting the housing member 60 with the arms 104. The forward end of the engine 13 is steadied on the brackets 50 by tightening of the cable 53. The engine is thus quickly mounted and securely held ready to be subjected to any desired test by the dynamometer apparatus 12.

Figure 9:
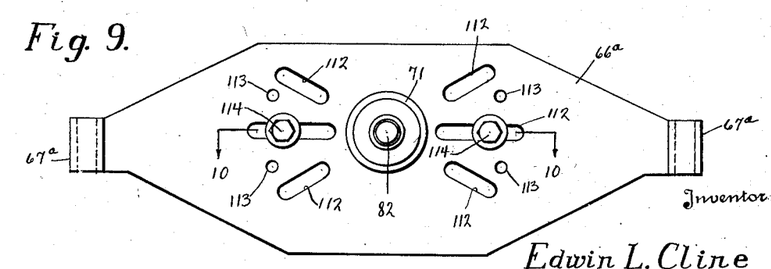
Fig. 9 is a front elevational view of a modified supporting plate for mounting the rear end of an engine.
Figure 10:
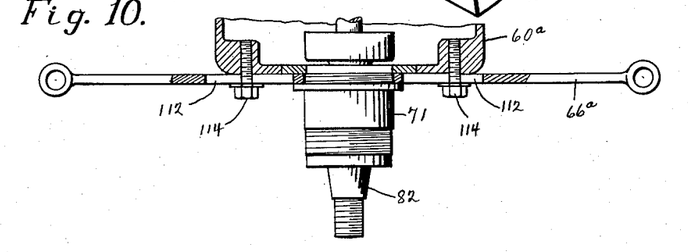
Fig. 10 is a view partly in section taken along the line 10—10 of Fig. 9, but illustrating the manner in which the mounting plate may be connected with an engine housing member.

Figs. 9 and 10 illustrate a modified form of rear end engine adapter means suitable for use in testing a limited number of types of engines. Thus, a plate 66a provided with bosses 67a is shown mounted upon a body or housing portion 71 in lieu of the plate 66. The plate 66a is provided with various slots 112 and holes 113 adapted for use in directly securing the plate 66a to a housing member 60a by bolts 114 extending through two horizontal slots 112. When the plate 66a is employed, it will be apparent that the arms 104 and the wing nut 101 are no longer needed and can be dispensed with. It will be understood, of course, that the housing portion 71 still serves as a mounting means for the adapter shaft 82, said shaft being mounted in ball bearings the same as in Fig. 4.

While the plates 66 and 66a have been shown primarily as mounting or supporting plates for the rear end of the engine, it is contemplated that the bosses 67 and 67a, respectively, thereof can be omitted, or retained and not utilized for their intended purpose, and the rear end of the engine supported instead by brackets similar to the brackets 50. In such event, the plates 66 and 66a will serve primarily as a mounting means for the adapter shaft 82, which can be optionally utilized to transmit torque from or to the engine, as desired.

It will be apparent from the foregoing that the present invention provides engine supporting and adapter means which is relatively simple in construction and which requires a minimum of adjustment for setting up an engine for driving by a motoring dynamometer, etc., or for testing by an absorption dynamometer, or for any other purpose.

It will be understood that various changes may be made in the details of construction and in the arrangement of the parts of the stand and adapter kit illustrated and described herein, without departing from the spirit of the invention or the scope of the annexed claims.

I claim:

1. Adapter means for supporting the rear end of an engine on an engine stand, said engine having a housing member at the rear end thereof provided with the usual opening for a transmission shaft, comprising: a plate adapted for mounting upon an engine stand; an elongated housing portion carried by said plate; an adapter shaft rotatably supported in said housing portion for transmitting driving torque; bushing means carried by said housing portion exteriorly thereof for centering said adapter shaft in a predetermined position of alignment with respect to the transmission shaft opening in said housing member; and torque transmitting means for establishing a driving connection between the engine and said adapter shaft.

2. Adapter means for supporting one end of an engine on an engine stand, said engine having a housing member at said one end provided with an opening for a transmission shaft, comprising: a plate adapted for mounting upon an engine stand; an elongated housing portion carried by said plate; an adapter shaft rotatably supported in said housing portion for transmitting driving torque, said housing portion having a cylindrical pilot portion on one end thereof; an annular bushing surrounding said pilot portion; and means detachably securing said bushing on said pilot portion, said bushing having an internal diameter to snugly fit said pilot portion and having an external diameter to snugly fit the transmission shaft opening in said housing member, whereby to center said adapter shaft with respect to said transmission shaft opening.

3. Adapter means for supporting one end of an engine on an engine stand, said engine having a housing member at said one end provided with an opening for a transmission shaft and with bolt holes for normally securing a transmission casing to said housing member, comprising: a housing portion; an adapter shaft rotatably supported in said housing portion, said housing portion including a pilot portion adapted to be received in the transmission shaft opening of said housing member to center said adapter shaft with respect thereto; a plate adapted to be supported by an engine stand; means securing said plate in non-rotatable relation to said housing adjacent said pilot portion, said plate having openings formed therein on either side of said housing for the passage of bolts and being shaped and arranged to expose at least two of the bolt holes in said housing member.

4. Adapter means for supporting one end of an engine upon an engine stand, said engine having a housing member at said one end provided with an opening for a transmission shaft and with bolt holes for securing a conventional transmission casing to said housing member, comprising: an elongated plate having means at each end thereof for mounting the same on an engine stand; an elongated housing portion carried by said plate and located substantially centrally of said plate; an adapter shaft rotatably supported in said housing portion for transmitting driving torque, said housing portion having means at one end thereof concentric with but spaced from said adapter shaft for centering said adapter shaft in a predetermined position of alignment with respect to the transmission shaft opening in said housing member, said plate having an opening therein of a size sufficient to expose at least one of the bolt holes in said housing member; and means cooperable with the exposed bolt hole for clamping said housing member to said plate when in use.

5. Adapter means for supporting one end of an engine on an engine stand, said engine having a housing member at said one end provided with an opening for a transmission shaft and with bolt holes for the reception of bolts for securing a transmission casing to said housing member, comprising: a housing portion; an adapter shaft rotatably supported in said housing portion, said housing portion including a pilot portion adapted to be received within the transmission shaft opening of said housing member; a plate secured in non-rotatable relation to said housing portion adjacent said pilot portion and being adapted to be supported by an engine stand, said plate having openings formed therein on either side of said housing shaped and arranged to expose at least two of the bolt holes in said housing member; a pair of clamping arms extending substantially radially from said housing portion, said clamping arms being adjustable relative to said housing portion; and means carried by said housing portion for locking said clamping arms in a desired position of adjustment relative to said housing portion, each of said clamping arms having an opening formed therein for the passage of a bolt cooperable with the exposed bolt holes in said housing member for securing said housing member to said clamping arms when in use.

6. Adapter means for supporting an engine having a clutch and flywheel housing at the rear end thereof provided with a shaft opening, and an element in said housing normally driven by the engine, comprising: an elongated plate having ends adapted to be secured to an engine stand to support the weight of the rear end of said engine; an elongated housing portion carried by said plate and located substantially centrally of said plate; an adapter shaft rotatably supported in said housing portion for transmitting driving torque; means concentric with but spaced from said adapter shaft for centering one end of said housing portion relative to the shaft opening in said clutch and flywheel housing; means for securing said clutch and flywheel housing relative to said plate to prevent movement of said clutch and flywheel housing in a direction away from said plate; and torque transmitting means for establishing a driving connection between the element normally driven by the engine and said adapter shaft.

7. Adapter means for supporting an engine having a clutch and flywheel housing at the rear end thereof provided with a shaft opening, and a splined element in said housing normally driven by the engine, comprising: a plate adapted to support the weight of the rear end of said engine; an elongated housing portion carried by said plate; an adapter shaft rotatably supported in said housing for transmitting driving torque to or from said engine, said adapter shaft having an internally toothed portion at one end thereof; means for centering one end of said housing portion relative to the shaft opening in said clutch and flywheel housing; means for securing said clutch and flywheel housing to said plate to prevent movement of said clutch and flywheel housing relative to said plate; and torque transmitting means for establishing a driving connection between said adapter shaft and said splined element normally driven by the engine, including a shaft having a toothed portion engaging with said internally toothed portion and a splined portion for engaging the splines of said normally engine-driven element.

8. A device, of the character described comprising: a plate adapted to be mounted upon a stand; an elongated body portion carried by said plate, said body portion including a flange intermediate its ends; clamping arm means angularly adjustable with respect to said body portion; and means on said body portion cooperable with said flange for locking said clamping arm means in a desired position of angular adjustment relative to said body portion.

9. A device of the character described, comprising: a plate adapted to be fixed relative to a power source and to be mounted upon a stand; an elongated housing portion carried by said plate; a shaft rotatably mounted in said housing portion and adapted to transmit torque from said power source, said housing portion including abutment means intermediate its ends; clamping arm means adapted to be secured to said power source and to fix said plate relative to said power source, said clamping arm means engaging said abutment and being angularly adjustable with respect to said housing portion; and means on said housing portion for locking said clamping arm means in a desired position of angular adjustment relative to said housing portion.

10. Adapter means for supporting the rear end of an engine upon a stand, comprising: a plate for securing an engine to a stand; an elongated housing portion carried by said plate, said housing portion including abutment means intermediate its ends; a plurality of clamping arms extending radially from said housing portion and being independently adjustable with respect to said housing portion; and means on said housing portion cooperable with said abutment means for locking said clamping arms in a desired position of angular adjustment relative to said housing portion.

11. Adapter means for supporting, upon a stand, an engine having a clutch and flywheel housing at one end thereof provided with a shaft opening, comprising: a plate adapted to support said one end of said engine upon a stand; a housing portion carried by said plate; means for centering said housing portion relative to said shaft opening in said clutch and flywheel housing of the engine, said housing portion including an abutment intermediate its ends and a threaded portion at one end thereof; a nut on said threaded portion; and adjustable clamping arm means between said abutment and nut, whereby said clamping arm means may be locked in a desired position of adjustment with respect to said plate when in use by tightening said nut.

12. Adapter means for supporting the rear end of an engine upon a stand, comprising: a body portion, said body portion including a pilot portion at one end thereof adapted to be received within an opening in a conventional clutch and flywheel housing at the rear end of an engine; a plate adapted to support the rear end of said engine upon a stand; means intermediate the ends of said plate securing said plate in non-rotatable relation to said body portion, said plate having openings formed therein on either side of said body portion; a flange on said body portion intermediate the ends thereof; a pair of clamping arms adjacent said flange and extending radially from said body portion, said arms being angularly adjustable relative to said body portion; and a nut carried by said body portion for locking said clamping arms in a desired position of adjustment, said nut having a stepped portion on the end thereof adjacent said clamping arms, each of said clamping arms having a ridge interlocked with said stepped portion of said nut, each of said clamping arms also having an elongated slot formed therein and registering with an opening in said plate for the reception of a bolt for securing said clamping arms and plate to said clutch and flywheel housing when the adapter means is in use.

13. Means for supporting an engine having a housing member at the rear end thereof enclosing an element normally driven by said engine and having an opening affording access to said element, comprising: a stand including a base, a pair of front columns for supporting the front end of said engine and a pair of rear columns for supporting the rear end of said engine, all of said columns being mounted upon said base; bracket means mounted upon each of said columns; means supported by the bracket means on said front columns for supporting the weight of the front end of said engine; a plate having means at the opposite ends thereof securing the same to the bracket means on said rear columns for supporting the weight of the rear end of said engine; a housing portion carried by said plate; an adapter shaft rotatably supported in said housing portion for transmitting torque from or to said engine, said housing portion including a pilot portion adapted to be received within the opening in said housing member affording access to said element normally driven by said engine and cooperable with said opening for substantially aligning the axis of said adapter shaft with the axis of rotation of said normally driven element; and torque transmitting means for establishing a driving connection between said normally engine-driven element and said adapter shaft.

14. Means for supporting an engine having a housing member at the rear end thereof containing bolt holes for normally securing a transmission housing thereto and enclosing an element normally driven by said engine and further having an opening affording access to said element, comprising: a stand including a base, a pair of front columns for supporting the front end of said engine and a pair of rear columns for supporting the rear end of said engine, all of said columns being mounted upon said base; bracket means mounted upon each of said columns; means supported by the bracket means on said front columns for supporting the weight of the front end of said engine; a plate having means at the opposite ends thereof securing the same to the bracket means on said rear columns for supporting the weight of the rear end of said engine; a housing portion carried by said plate; an adapter shaft rotatably supported in said housing portion for transmitting torque from or to said engine, said housing portion including a pilot portion adapted to be received within said opening in said housing member affording access to said element normally driven by said engine and cooperable with said opening for substantially aligning the axis of said adapter shaft with the axis of rotation of said normally driven element; and torque transmitting means for establishing a driving connection between said normally engine-driven element and said adapter shaft, said plate having openings formed therein on either side of said housing portion for the passage of bolt means cooperable with said bolt holes in said housing member for drawing said housing member toward said plate when in use.

15. Means for supporting an engine having a housing member at the rear end thereof containing bolt holes for normally securing a transmission housing thereto and enclosing an element normally driven by said engine and further having an opening affording access to said element, comprising: a stand including a base, a pair of front columns for supporting the front end of said engine and a pair of rear columns for supporting the rear end of said engine, all of said columns being mounted upon said base; bracket means mounted upon each of said columns; means supported by the bracket means on said front columns for supporting the weight of the front end of said engine; a plate having means at the opposite ends thereof securing the same to the bracket means on said rear columns for supporting the weight of the rear end of said engine; a housing portion carried by said plate; an adapter shaft rotatably supported in said housing portion for transmitting torque from or to said engine, said housing portion including a pilot portion adapted to be received within said opening in said housing member affording access to said element normally driven by said engine and cooperable with said opening for substantially aligning the axis of said adapter shaft with the axis of rotation of said normally driven element; torque transmitting means for establishing a driving connection between said normally engine-driven element and said adapter shaft, said plate having openings formed therein on either side of said housing portion for exposing said bolt holes in said housing member; and arm means carried by said housing portion, said arm means including openings adapted to be aligned with said bolt holes in said housing member so that bolt means can be extended through said openings in said clamping arm means and said openings in said plate for securing said housing member against relative movement with respect to said plate when said plate is in use.

16. An adapter device of the character described, comprising: an elongated plate constructed and arranged to have its opposite ends mounted upon a stand to support the weight of one end of an engine; an elongated housing portion carried by said plate and including cylindrical portions projecting from the opposite sides of said plate, one of said cylindrical portions being adapted to have an annular member mounted thereon; and an adapter shaft rotatably mounted in said housing portion, said adapter shaft extending through said housing portion and having its ends projecting beyond said housing portion, said plate having at least one mounting opening extending therethrough between its ends and on either side of said housing portion.

17. An adapter device as defined in claim 16, including a torque transmitting shaft axially alignable with the adapter shaft for establishing a driving connection between an engine shaft and one end of the adapter shaft mounted in the elongated housing portion.

18. An adapter device of the character described, comprising: a plate constructed and arranged to be mounted upon a stand; an elongated housing portion carried by said plate; an adapter shaft rotatably mounted in said housing portion, said plate having a mounting opening extending therethrough on either side of said housing portion; angularly adjustable means carried by said housing portion, said angularly adjustable means having openings alignable with the mounting openings in said plate; and means locking said angularly adjustable means in a desired position of adjustment.

19. An adapter device of the character described, comprising: an elongated plate having end portions constructed and arranged to be mounted upon a stand; an elongated hollow cylindrical housing portion carried by said plate at a location medially of the length of said plate; and an adapter shaft rotatably mounted in said housing portion and carrying a toothed gear element at one end thereof disposed to one side of said plate, said elongated housing having a pilot portion at one end thereof concentric with the axis of said shaft and projecting from said one side of said plate toward said toothed gear element, said plate having at least one mounting opening extending therethrough on either side of said housing portion for securing the medial portion of said plate to a conventional clutch housing.

20. An adapter device as defined in claim 19, including a torque transmitting element axially alignable with the adapter shaft and having gear teeth engageable with the toothed gear element on the adapter shaft.

21. Means for supporting a power source on a stand, said power source having a housing member provided with an opening for a shaft, comprising: an elongated plate having a central portion adapted for mounting in direct contact with said housing member and having portions extending laterally from opposite sides of said central portion and terminating in bosses for supporting said power source on a stand; a housing portion carried by said central portion of said plate; an adapter shaft rotatably supported in said housing portion for transmitting torque to or from said power source; and means on said housing portion of the same size as the shaft opening in said housing member and being receivable in said shaft opening for centering said housing portion in a predetermned positon of alignment with respect to said shaft opening.

22. Adapter means for supporting one end of an engine on an engine stand, said engine having a housing member at one end thereof containing a clutch element normally driven by said engine and being provided with an opening for a conventional transmission shaft normally connected with said clutch element, comprising: an elongated plate having a central portion adapted for mounting in direct contact with said housing member and having portions extending laterally from opposite sides of said central portion and terminating in bosses for supporting said one end of said engine upon an engine stand; a housing portion carried by said central portion of said plate; an adapter shaft rotatably supported in said housing portion for transmitting torque to or from said engine; means concentric with but spaced from said adapter shaft for centering said adapter shaft in a predetermined position of alignment with respect to said transmission shaft opening in said housing member; and torque transmitting means including a shaft adapted to be interposed between said clutch element of said engine and said adapter shaft for establishing a driving connection between said clutch element and said adapter shaft.

23. Means for supporting one end of an engine on an engine stand for testing by a power absorption device, said engine having a housing member at one end thereof provided with a conventional opening for a transmission shaft and with bolt holes for normally securing a conventional transmission casing to said housing member, comprising: an elongated plate having a central portion and ends spaced from said central portion adapted for mounting upon an engine stand; a housing portion carried by said central portion of said plate; a shaft rotatably supported in anti-friction bearings in said housing portion for transmitting engine driving torque to a power absorpton device; annular adapter means mountable in predetermined fixed relation to said plate and receivable within the transmission shaft opening in said housing member for centering said shaft in a predetermined position of alignment with respect to said transmission shaft opening; and means cooperable with the bolt holes in said housing member for securing said housing member against movement relative to said central portion of said plate when said plate is in use.

24. Means for supporting one end of an engine on an engine stand, said engine having a housing member at the rear end thereof provided with a conventional opening for a transmission shaft and with bolt holes for normally securing a conventional transmission casing to said housing member, comprising: an elongated plate having vertical apertured bosses at its ends adapted to receive bolts for mounting said plate upon an engine stand; an elongated housing portion carried by said plate at a region medially of the ends of said plate; an adapter shaft rotatably supported in said housing portion for transmitting driving torque, said housing portion having a pilot portion on one end thereof cooperable with the transmission shaft opening in said housing member for centering said adapter shaft in a predetermined position of alignment with respect to said transmission shaft opening; and means cooperable with the bolt holes in said housing member for securing said housing portion in fixed relation with said housing member when said plate is in use.

25. A device of the character described, comprising: a housing; a shaft rotatably supported in said housing and adapted to transmit torque, said housing including a pilot portion at one end thereof arranged concentric with the axis of said shaft but spaced from said shaft for centering said one end of said housing in a given opening; an elongated plate having longitudinally spaced ends adapted to be secured to a stand, said plate being adapted to serve as a mounting for said housing; and means securing said housing to said plate.

26. An adapter device of the character described, comprising: a plate constructed and arranged to be mounted upon a stand; an elongated housing portion carried by said plate; an adapter shaft rotatably mounted on said housing portion and carrying a toothed element at one end thereof, said elongated housing having a pilot portion concentric with the axis of said shaft, said plate having at least one mounting opening extending therethrough on either side of said housing portion; and an annular bushing adapted to be mounted upon the pilot portion of said housing.

27. An adapter device as defined in claim 26, including means for detachably retaining the annular bushing upon the pilot portion of the housing.

EDWIN L. CLINE.

REFERENCES CITED

The following references are of record in the file of this patent:

UNITED STATES PATENTS

| Number | Name | Date |
|---|---|---|
| 1,078,042 | Ford | Nov. 11, 1913 |
| 1,541,083 | Walker | June 9, 1925 |
| 1,568,544 | Chilton | Jan. 5, 1926 |
| 1,658,344 | Kurtz | Feb. 7, 1928 |
| 1,727,869 | Dultmeier | Sept. 10, 1929 |
| 1,786,067 | Horste | Dec. 23, 1930 |
| 1,802,588 | Thieman | Apr. 28, 1931 |
| 2,215,117 | Cressman | Sept. 17, 1940 |
| 2,488,741 | Rosenthal et al. | Nov. 22, 1949 |

FOREIGN PATENTS

| Number | Country | Date |
|---|---|---|
| 667,535 | Germany | Nov. 14, 1938 |